2,940,990
17-DIACETALS OF ESTRONE

Esteban Volkov and George Rosenkranz, Mexico City, Mexico, assignors to Syntex S.A., Mexico City, Mexico, a corporation of Mexico No Drawing. Filed May 22, 1956, Ser. No. 586,370

7 Claims. (Cl. 260—397.5)

The present invention relates to a process for the production of cyclopentanophenanthrene derivatives and to certain novel intermediates utilized in the process.

More particularly, the present invention relates to a novel process for the production of 3-lower alkoxy 19-nor-$\Delta^{2,5(10)}$-androstadiene-17-one derivatives, and especially the corresponding 3-methoxy compound, as well as to certain novel intermediates for the production of these compounds.

3-methoxy - 19 - nor - $\Delta^{2,5(10)}$-androstadiene-17-one is a known intermediate which may be easily transformed into the valuable progestational hormone $\Delta^4$-19-nor-17-ethinyl-androstene-17$\beta$-ol-3-one (19 - nor-ethinyltestosterone) which is disclosed in United States Patent No. 2,744,122, granted May 1, 1956. Although there is disclosed in this United States patent a process for the production of a 19-nor-ethinyltestosterone, there has been discovered in accordance with the present invention a more efficient process utilizing as a starting material estrone and involving preparation of the novel 17-diacetal of estrone, the conversion of the 17-diacetal of estrone into the corresponding 3-lower alkoxy derivative, the reduction of the aromatic system in Ring A to a diene system by reaction with an alkali metal in solution in liquid ammonia, and finally the selective hydrolysis of the novel 17-diacetal of the 3-lower alkoxy 19-nor-$\Delta^{2,5(10)}$-androstadiene-17-one to produce the known intermediates, namely the 3-lower alkoxy derivatives of 19-nor-$\Delta^{2,5(10)}$-androstadiene-17-one. These last compounds and especially the 3-methoxy compound, as is known, may be provided with a 17$\alpha$-ethinyl group by reaction with acetylene in the presence of potassium $t$-amylate and thereafter subjected to the action of a dilute acid to hydrolyze the methoxyl group at C-3 and simultaneously cause migration of the double bond to form the $\Delta^4$-3-keto system of 19-nor-17-ethinyltestosterone.

The following equation serves to illustrate the process of the present invention and the production of the novel intermediates hereinbefore referred to:

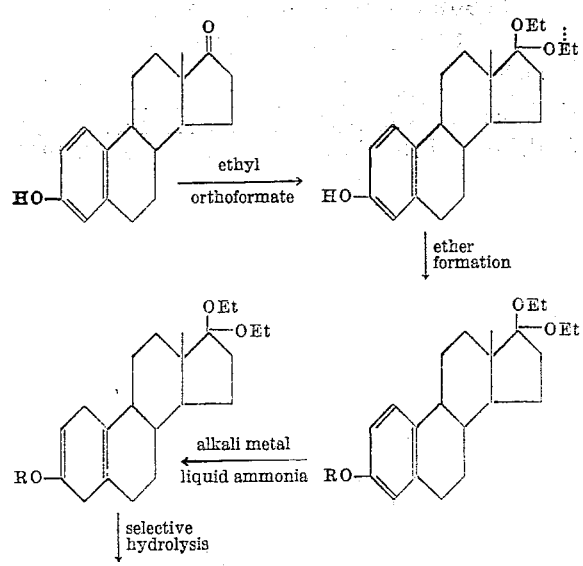

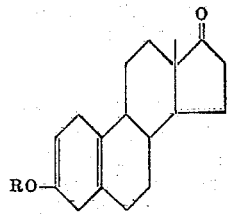

In the above equation R represents a lower alkyl group.

For the first step of the reaction set forth above, the estrone is suspended in an organic solvent such as absolute ethanol and treated with ethyl orthoformate. There is then added a small amount of mineral acid, such as sulfuric acid, and the mixture is heated at 40° C. for a short period of time. Thereafter, additional ethyl orthoformate is added and the heating is continued at a slightly higher temperature for a short period of time until all of the estrone has gone into solution. The solution is then cooled and there is added slowly an alkali such as potassium hydroxide, and thereafter water. The solution now contains the diacetal of estrone which may be utilized for further reaction without separation.

For the production of the corresponding 3-ether as for example the methyl ether, there is added to the solution dimethyl sulfate dropwise, together with potassium hydroxide or other alkali in pellet form, the pH being maintained above 11. After the addition of the methyl sulfate water is added and an additional quantity of alkali. The stirring is then continued for a short period of time to complete the hydrolysis of the excess of methyl sulfate. A crystalline product obtained is filtered, washed and dissolved in the organic solvent such as hexane containing pyridine, and the solution concentrated. An oil is obtained which consists of the 17-diacetal of the 3-methyl ether of estrone which can be used without further purification for the next step or stored under refrigeration. For the reduction the 17-diacetal of the 3-methyl ether of estrone is dissolved in an organic solvent such as Dowanol 33, a glycol monoether and the solution cooled to substantially below room temperature, as, for example, a temperature of the order of 3° C. There is then added anhydrous liquid ammonia and thereafter an alkali metal in small pieces, such as lithium metal. The reaction solution is stirred for approximately one hour and thereafter there is added water containing a small amount of hydroquinone. The product is filtered and washed to neutrality, as with water containing a small amount of hydroquinone. The resultant product is the 3-methyl ether 17-diacetal of 19-nor-$\Delta^{2,5(10)}$-androstadiene-3$\beta$-ol-17-one. The moist product of this step is dissolved with stirring in an organic solvent such as benezene. Ethyl alcohol is then added and the temperature of the solution adjusted to room temperature, or approximately 20° C. Thereafter, under vigorous agitation there is added only sufficient acid, preferably a dilute mineral acid such as sulfuric acid, in alcohol, in a quantity to produce a slightly acid condition, and the reaction is allowed to continue for a very short period of time as of the order of 16 seconds to one minute. It is found that with this short period of hydrolysis, which is terminated by the addition of a base such as potassium hydroxide, in water and alcohol, there is a quantitative selective hydrolysis of the protective diacetal grouping at 17, without affecting the ether group at C-3. The resultant product is for example the 3-methoxy-19-nor-$\Delta^{2,5(10)}$-androstadiene-17-one, which may be converted by known methods into 19-norethinyltestosterone. The present method possesses the decided advantage that the reduction of the aromatic system to the $\Delta^4$-3-keto system is effected with the protection of the keto group at C–17 in the form of the diacetal. This avoids the necessity of the regeneration of this group by subsequent oxidation which in practice was found to be a difficult and dangerous operation.

The following specific examples serve to illustrate but are not intended to limit the present invention:

Example I 100 g. of perfectly dry estrone suspended in 400 cc. of absolute ethanol was treated with 100 cc. of anhydrous ethyl orthoformate. Under mild stirring there was then added 1 cc. of C.P. sulfuric acid and the mixture was heated at 40° C. for 35 minutes. An additional 25 cc. of ethyl orthoformate was added and the heating was continued at 55° C. for 20 to 30 minutes until all of the estrone had gone into solution. Under external cooling, there was added in the course of 15 minutes 50 g. of potassium hydroxide in pellet form; the temperature is allowed to drop to 10° C. and then 400 cc. of water was added.

Under strong stirring there was added simultaneously (a) 55 cc. of dimethyl sulfate at a rate of approximately 2 to 3 drops per second and (b) potassium hydroxide in pellets, in portions of 10 g. each time the pH showed a tendency to drop below 11. After the addition of all of the methyl sulfate, there is slowly added 400 cc. of water and the amount of potassium hydroxide is completed to 50 g., including the one added previously. The stirring is continued for 30 minutes to complete the hydrolysis of the excess of methyl sulfate. The crystalline product is filtered (from the filtrate approximately 5% of un-reacted estrone can be recovered upon acidification), washed abundantly with slightly alkaline water and then dissolved in 2 lt. of hexane containing 10 cc. of pyridine. The water that may be present is separated in a separatory funnel and the solution is dried over sodium sulfate and quickly concentrated at the temperature of the steam bath. Nearly at the end the temperature is lowered and the concentration is conducted under reduced pressure. Thus, an oil is obtained, weighing approximately 135 g., consisting of the 17-diacetal of the 3-methyl ether of estrone, which is used without further purification in the following step. If the next operation is not carried out immediately, it is convenient to keep the product in the refrigerator.

Example II

The 135 g. of the 17-diacetal of the 3-methyl ether of estrone, obtained in accordance with Example I, was dissolved in 4 ltr. of anhydrous Dowanol 33 and the solution was cooled to a temperature of approximately 3° C. Under strong stirring in anhydrous conditions there was then added 6 lt. of anhydrous liquid ammonia, followed, after a time of approximately 4 to 8 minutes, by 100 g. of lithium metal in small pieces. The stirring was continued for 60 minutes and then there was added 10 lt. of iced distilled water containing 1% of hydroquinone. The product is filtered taking care that it does not go dry in the funnel, and washed perfectly to neutral with a great excess of water containing 1% of hydroquinone.

120 g. was thus obtained of the 3-methyl ether 17-diacetal of 19-nor-$\Delta^{2,5(10)}$-androstadien-3$\beta$-ol-17-one.

The moist product is dissolved with mild stirring in 550 cc. of benzene and, if necessary, water is added so the reaction mixture has a weight of 900 g. In case the mixture weighs more, some of the water is decanted until such weight is attained. 2 lt. of 96% alcohol is added and the temperature of the solution is adjusted to 20° C. Under strong stirring a solution of 4.4 cc. of C.P. sulfuric acid in 50 cc. of alcohol is added. After 16 seconds, a solution is added of 15 g. of U.S.P. potassium hydroxide in 10 cc. of water and 50 cc. of alcohol. The mixture should remain slightly alkaline and the stirring is stopped to avoid airing of the solution. The mixture is then evaporated to dryness under reduced pressure at the temperature of the steam bath, passing a slow stream of nitrogen through the solution. At the end, the stream of nitrogen is continued until the product has cooled and the product is kept under an atmosphere of nitrogen until it is used for the following operation. The 3-methoxy-19-nor-$\Delta^{2,5(10)}$-androstadien-17-one thus obtained had a melting point of 128°–131° C., $[\alpha]_D$ +199°.

We claim:

1. A method for the production of a 3-lower alkoxy 19 - nor - $\Delta^{2,5(10)}$ - androstadiene-17-one which comprises forming the 17-diacetal of estrone by reacting estrone with ethyl orthoformate, converting the 17-diacetal of estrone into the corresponding 3-lower alkoxy ether, treating the 3-lower alkoxy ether with an alkali metal in liquid ammonia to reduce the aromatic system in Ring A to a diene system and prepare the 17-diacetal of 3-methoxy-19-nor-$\Delta^{2,5(10)}$-androstadiene-17-one and thereafter selectively hydrolyzing the diacetal group at C–17 by a short acid treatment.

2. The process of claim 1, wherein the ether is the 3-methyl ether which is prepared by reaction with dimethyl sulfate and the alkali metal is lithium.

3. The process of claim 1, wherein the selective hydrolysis of the diacetal group of 3-lower alkoxy 17-diacetal of 19-nor-$\Delta^{2,5(10)}$-androstadiene-3$\beta$-ol-17-one is performed by dissolving the starting material in a mixture of benzene and ethyl alcohol, the solution thus prepared is slightly acidified with sulfuric acid, and after a period of reaction of less than one minute the mixture is neutralized.

4. A new compound selected from the group consisting of the 17-diacetal of estrone, the 17-diacetal of 3-lower alkoxy estrone and the 17-diacetal of 3-lower alkoxy-19-nor-$\Delta^{2,5(10)}$-androstadien-17-one.

5. The 17-diacetal of estrone.

6. The 17-diacetal of 3-methoxy estrone.

7. The 17-diacetal of 3-methoxy-19-nor-$\Delta^{2,5(10)}$-androstadien-17-one.

References Cited in the file of this patent

UNITED STATES PATENTS

| 2,550,702 | Levin | May 1, 1951 |
| 2,655,518 | Colton | Oct. 13, 1953 |
| 2,734,066 | Ercoli et al. | Feb. 7, 1956 |
| 2,781,365 | Djerassi | Feb. 12, 1957 |